US008534137B2

(12) United States Patent
Renoud et al.

(10) Patent No.: US 8,534,137 B2
(45) Date of Patent: Sep. 17, 2013

(54) FLUID METER, IN PARTICULAR A WATER METER

(75) Inventors: Anthony Renoud, Saint Andre D'Huiriat (FR); Sebastien Schwenter, Odenas (FR)

(73) Assignee: Itron France (FR)

( * ) Notice: Subject to any disclaimer, the term of this patent is extended or adjusted under 35 U.S.C. 154(b) by 106 days.

(21) Appl. No.: 13/398,964

(22) Filed: Feb. 17, 2012

(65) Prior Publication Data

US 2013/0086992 A1 Apr. 11, 2013

(30) Foreign Application Priority Data

Oct. 6, 2011 (EP) .................................... 11306290

(51) Int. Cl.
*G01F 1/00* (2006.01)

(52) U.S. Cl.
USPC ............................................................ 73/861

(58) Field of Classification Search
USPC ............................ 73/861, 258, 431, 273, 198
See application file for complete search history.

(56) References Cited

U.S. PATENT DOCUMENTS 4,565,090 A * 1/1986 Gotanda ......................... 73/198
5,261,275 A * 11/1993 Davis .............................. 73/258
5,444,942 A * 8/1995 Knudsen ......................... 49/261
5,493,917 A 2/1996 Clanin
5,741,969 A * 4/1998 Sebastopoli .................... 73/273
2008/0271529 A1* 11/2008 Davies ............................ 73/431

FOREIGN PATENT DOCUMENTS

DE 202007003276 6/2007
DE 202011002470 5/2011
EP 0580520 1/1994
EP 2320400 5/2011

OTHER PUBLICATIONS

Machine translation of Abstract of EP 0580520 above.

* cited by examiner

*Primary Examiner* — Jewel V Thompson
(74) *Attorney, Agent, or Firm* — Dority & Manning, P.A.

(57) ABSTRACT

The invention relates to a fluid meter, in particular a water meter, comprising a counter presenting an upper electronic card including a meter screen, the counter being covered by a cover including a window for viewing said screen, and said cover itself being covered by a cap presenting an external window for viewing said screen, a screen cover being mounted on said cap to cover and protect said screen and said external window. According to the invention, said screen-cover is provided with at least one pivot pin placed on a bearing carried by said cap, and said cap is provided with at least one orifice for passing a locking element for locking said pin on said bearing, the locking element being carried by said cover.

5 Claims, 4 Drawing Sheets

5
4
4'A
3
3A
2E
2B
2D
2C
2
2A
1

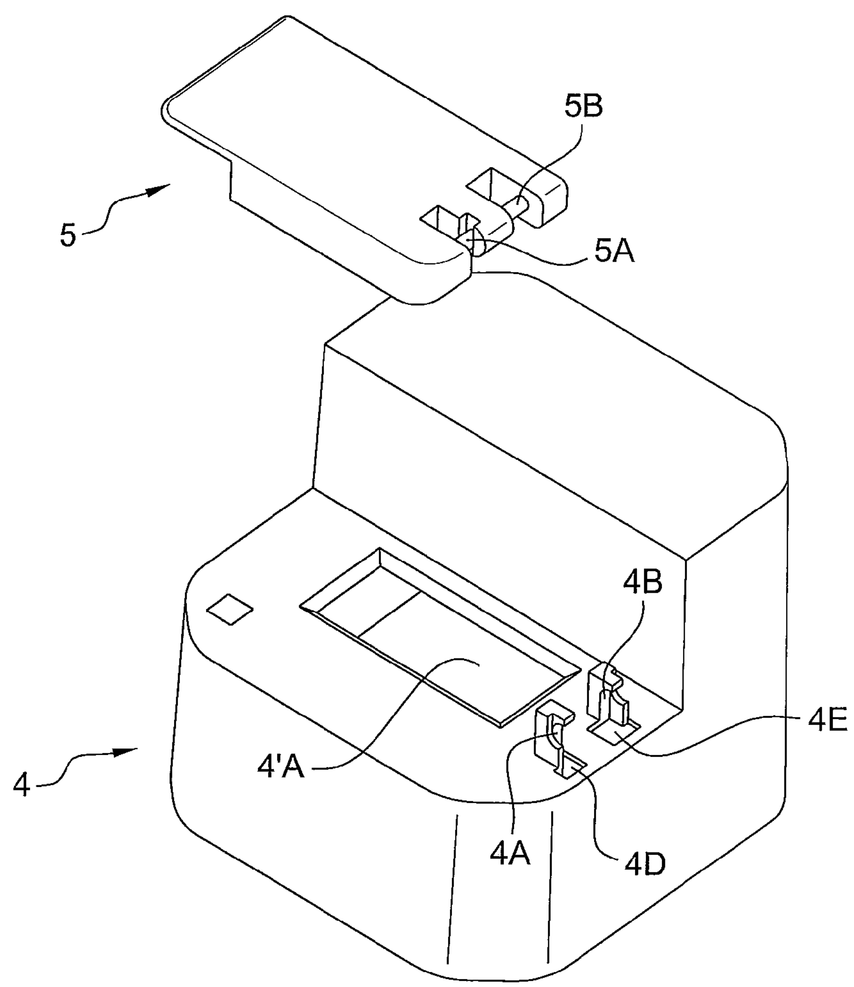
Fig. 2
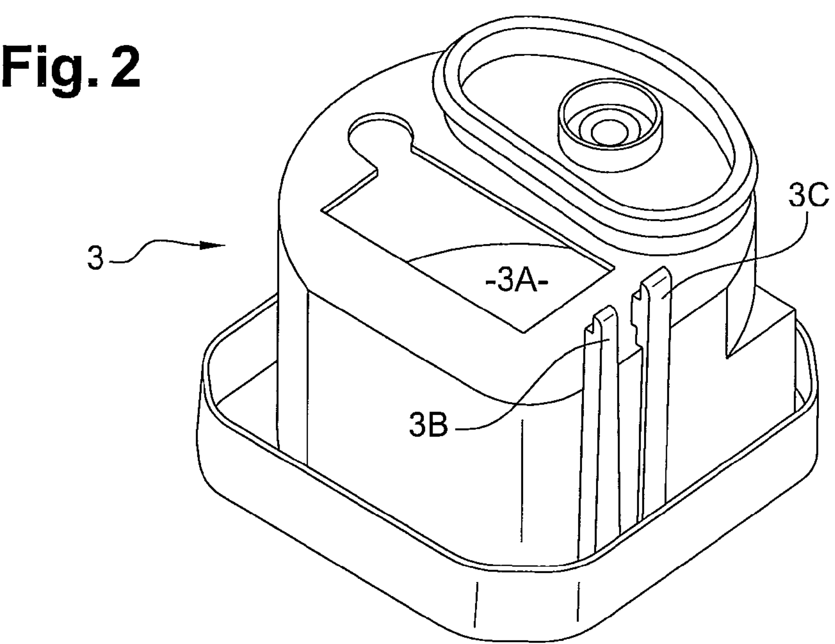

FLUID METER, IN PARTICULAR A WATER METER

PRIORITY CLAIM

This application is a U.S. patent application which claims priority to EP Application No. 11306290.5 filed Oct. 6, 2011, which is incorporated herein by reference in its entirety for all purposes.

The invention relates to a fluid meter, in particular a water meter.

Conventionally, a fluid meter, in particular a water meter, comprises a vessel having an inlet pipe and an outlet pipe for water and containing a measurement chamber, which may be of the turbine type, or of the oscillating piston type, or which may be static, e.g. using ultrasound. A counter is mounted on and connected to the vessel in order to determine the flow rate or the volume of water passing through the vessel. The counter includes various electrical, mechanical, and electronic elements and it is contained in a cover, generally made of plastics material, which cover serves to hold it and includes a window for viewing a meter screen, in general a liquid crystal screen.

The cover is itself covered by a cap that bears markings specific to the meter, that performs an antifraud function, and that presents an external window for viewing the screen.

A screen-cover may be mounted on the cap in order to cover and protect the screen from ultraviolet rays and prevent external elements such as mud or dust being introduced via the external window.

The invention relates to this screen-cover arrangement.

The screen-cover constituted by a pivoting mask may merely be clipped onto the cap, by mounting a shaft carried by the screen-cover in clip-fastener elements that form a hinge, and under such circumstances it can be removed, should it be desired to have a meter that is not provided with such a screen-cover.

Nevertheless, under such circumstances, the screen-cover may also be removed easily or it may even be inadvertently omitted during fabrication, even though it is essential for the screen, and above all its external window, to be protected under environmental conditions that are particularly difficult, e.g. because of dust.

The invention solves this problem by proposing a screen-cover arrangement that is not separable, while also being particularly simple to assemble during fabrication of the meter. Assembly may be performed completely manually.

To this end, the invention provides a fluid meter, in particular a water meter, comprising a counter presenting an upper electronic card including a meter screen, the counter being covered by a cover including a window for viewing said screen, and said cover itself being covered by a cap presenting an external window for viewing said screen, a screen cover being mounted on said cap to cover and protect said screen and said external window, the meter being characterized in that said screen-cover is provided with at least one pivot pin placed on a bearing carried by said cap, and in that said cap is provided with at least one orifice for passing a locking element for locking said pin on said bearing, the locking element being carried by said cover.

In a preferred embodiment, said bearing is constituted by a housing of upside-down L-shaped section.

Under such circumstances, and advantageously, the locking element is constituted by a complementary housing of L-shaped section, said orifice being adjacent to said bearing.

Said screen-cover may be provided with two said pivot pins disposed on two said bearings, and said cap may be provided with two said orifices for passing two said locking elements.

Said screen-cover may be provided with a return spring for returning it to the closed position.

The invention is described below in detail with reference to figures that show merely a preferred embodiment of the invention.

FIG. 2 is a fragmentary exploded perspective view of a meter in accordance with the invention.

Figure 1:
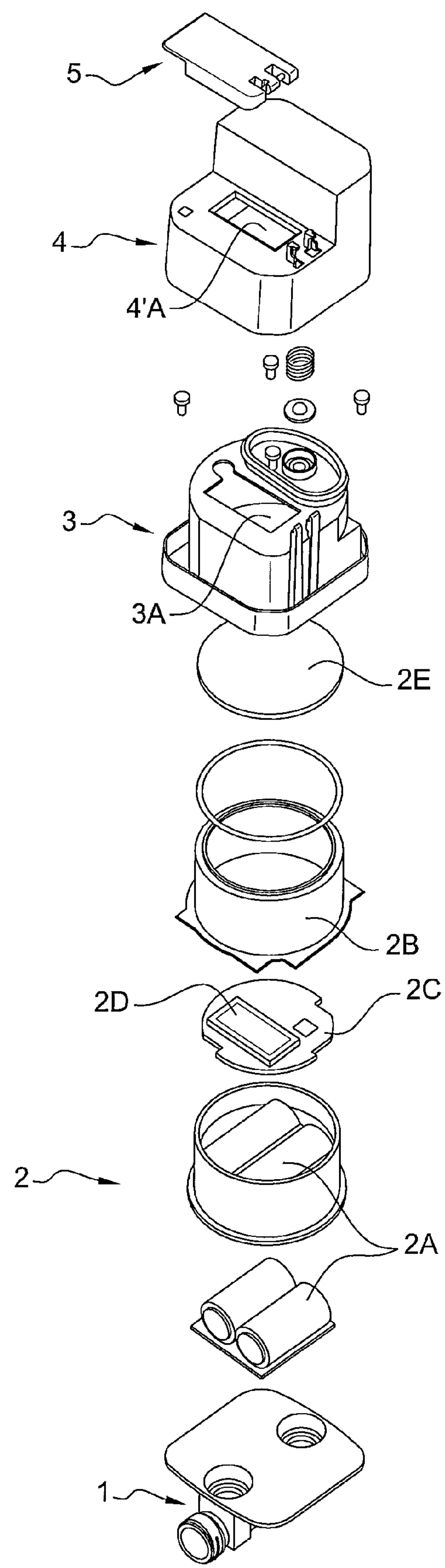
FIG. 1 is an exploded perspective view of a meter in accordance with the invention.

As shown in FIG. 1, a fluid meter, in particular a water meter, comprises a vessel 1 having an inlet pipe and an outlet pipe for water, and containing a measurement chamber, which may be of the turbine type, or of the oscillating piston type, or which may be static, e.g. using ultrasound. A counter 2 is mounted on and connected to the vessel 1 in order to determine the flow rate or the volume of water passing through the vessel. The counter 2 comprises various electrical, mechanical, and electronic elements 2A and it is contained in a casing 2B, e.g. a metal casing, and it includes an upper electronic card 2C including a meter screen 2D and covered by a transparent plate 2E made of plastics material or of glass.

The counter 2 is covered by a cover 3, generally made of plastics material, that serves to hold it and that includes a window 3A for viewing the screen 2D.

Finally, the cover 3 is itself covered by a cap 4 that carries markings specific to the meter, that performs an antifraud function, and that also presents an external window 4'A for viewing the screen 2D. As shown in FIG. 1, it may contain a remote-reading antenna.

A screen-cover 5 is mounted on the cap 4 to cover and protect the screen from ultraviolet rays and to protect the external window 4'A in order to prevent external elements such as mud or dust being introduced.

FIG. 2 shows the cover 3, the cap 4, and the screen-cover 5 on a larger scale.

The screen-cover 5 is provided with two pivot pins 5A, 5B, each disposed in a bearing 4A, 4B that is carried by the cap 4, and the cap is provided with two orifices 4D, 4E for passing respective locking elements 3B, 3C for locking the pins 5A, 5B on the bearings 4A, 4B, these locking elements being carried by the cover 3.

Although the embodiment shown and described presents two pins, two bearings, and two locking elements, it is possible in the invention to provide a number of pins that is different, and even to provide only a single pin, a single bearing, and a single locking element.

Figure 3:
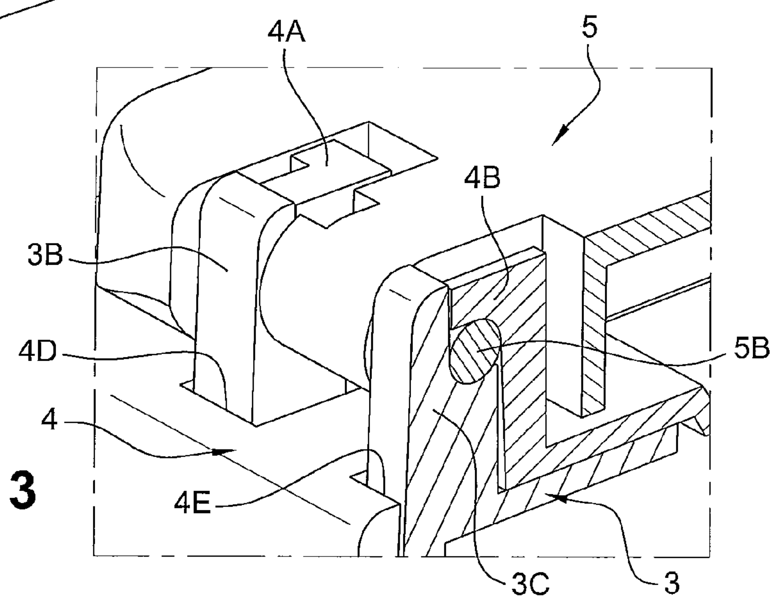
FIG. 3 is a fragmentary section view of a meter in accordance with the invention.

FIG. 3 is a section view of these elements in the assembled position. This section is taken transversely to one of the pins 5B.

Figure 4:
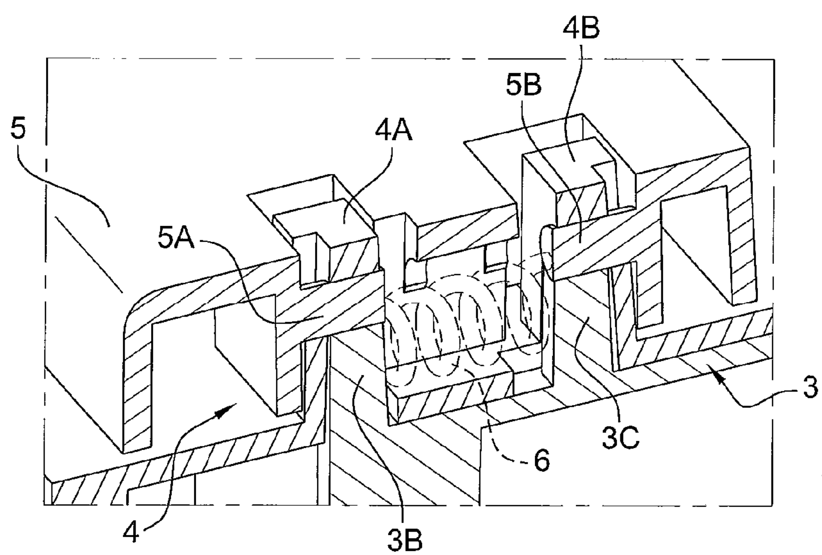
FIG. 4 is another fragmentary section view of a meter in accordance with the invention.

FIG. 4 is another section view of these elements in the assembled position. This section is taken on the longitudinal axis of the pins 5A, 5B.

As can be seen in the figures, each bearing 4A, 4B is constituted by a housing of upside-down L-shaped section, and each locking element 3B, 3C is constituted by a complementary housing of L-shaped section, each orifice 4D, 4E being adjacent to the corresponding bearing.

During assembly, the pins 5A, 5B carried by the screen-cover 5 are placed on the bearings 4A, 4B carried by the cap 4, and then the cap 4 is placed on the cover 3, the locking elements 3B, 3C being inserted into the corresponding orifices 4D, 4E. With the cap 4 and the cover 3 being kept assembled together, the bearings 4A, 4B and the locking elements 3B, 3C form non-separable hinges for opening or closing the screen-cover 5 by pivoting its pins 5A, 5B.

The screen-cover 5 may be provided with a return spring 6 for returning it to the closed position.

Figure 6:
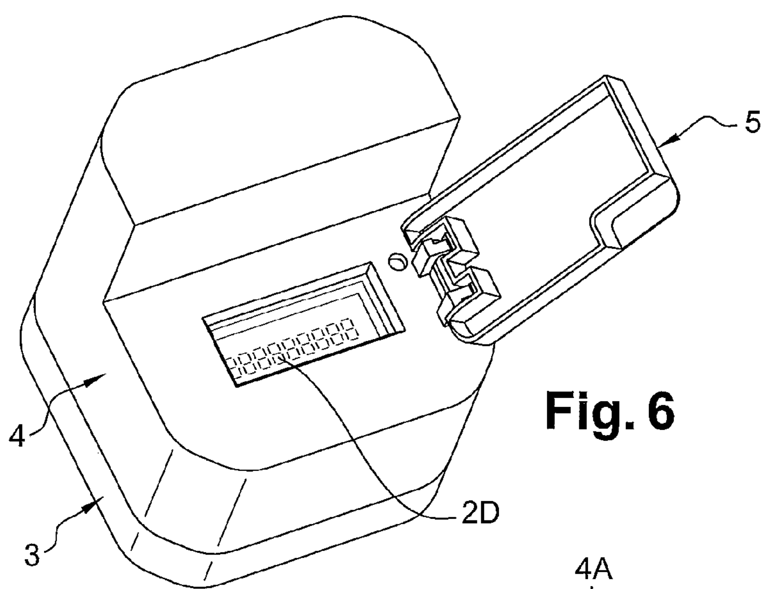
FIG. 6 is a perspective view of a meter in accordance with the invention, with its screen-cover open.
Figure 5:
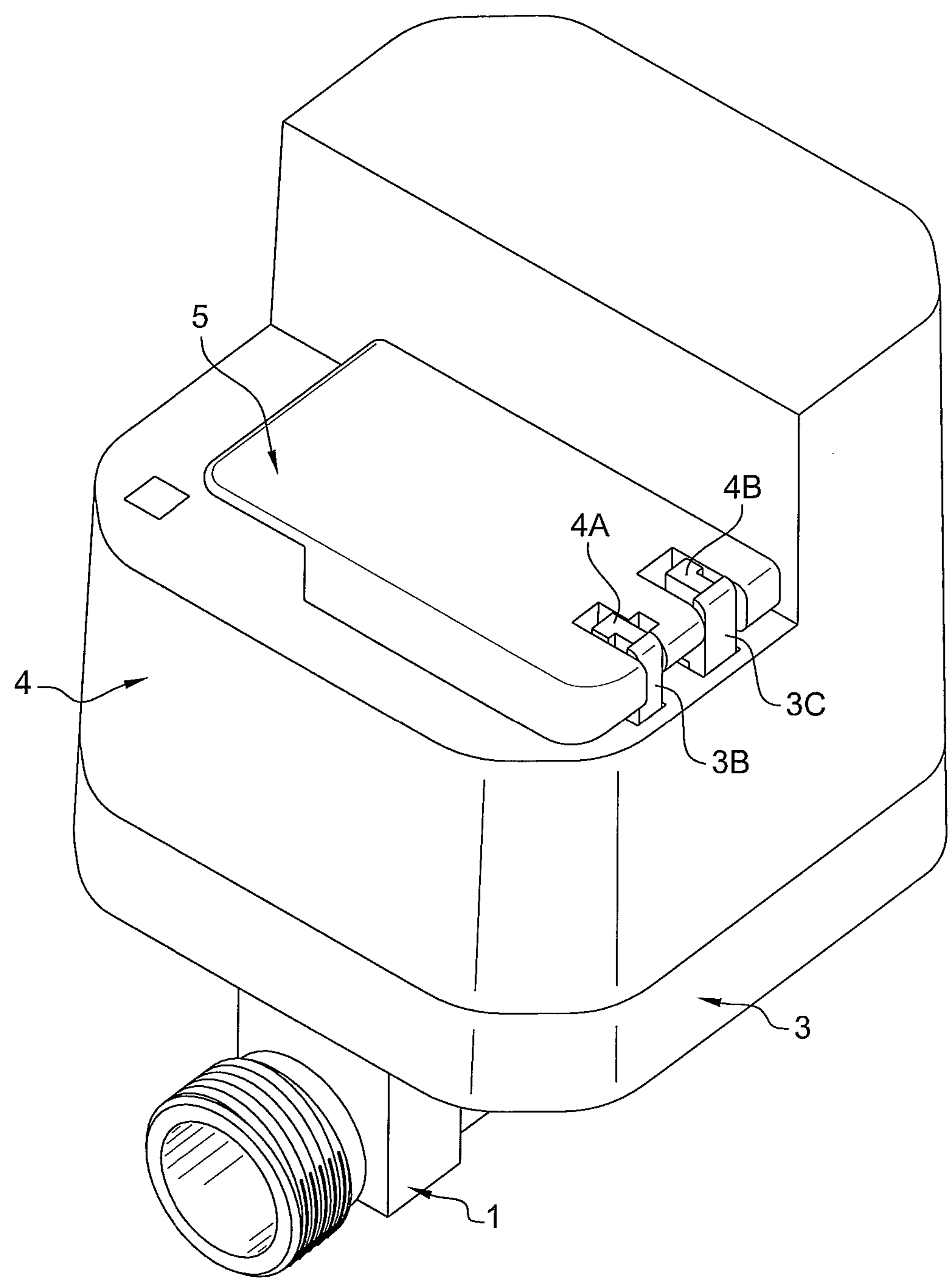
FIG. 5 is a perspective view of a meter in accordance with the invention, with its screen-cover closed.

FIG. 5 is a perspective view of a meter in accordance with the invention, showing its screen-cover 5 closed, and FIG. 6 is a perspective view of a meter in accordance with the invention, showing its screen-cover 5 open.

What is claimed is:

1. A fluid meter, in particular a water meter, comprising a counter presenting an upper electronic card including a meter screen, the counter being covered by a cover including a window for viewing said screen, and said cover itself being covered by a cap presenting an external window for viewing said screen, a screen cover being mounted on said cap to cover and protect said screen and said external window, the meter being characterized in that said screen-cover is provided with at least one pivot pin placed on a bearing carried by said cap, and in that said cap is provided with at least one orifice for passing a locking element for locking said pin on said bearing, the locking element being carried by said cover.

2. A meter according to claim 1, characterized in that said bearing is constituted by a housing of upside-down L-shaped section.

3. A meter according to claim 2, characterized in that the locking element is constituted by a complementary housing of L-shaped section, said orifice being adjacent to said bearing.

4. A meter according to claim 1, characterized in that said screen-cover is provided with two said pivot pins disposed on two said bearings, and in that said cap is provided with two said orifices for passing two said locking elements.

5. A meter according to claim 1, characterized in that said screen-cover is provided with a return spring for returning it to the closed position.

* * * * *